United States Patent
Emmot et al.

(10) Patent No.: US 7,426,596 B2
(45) Date of Patent: Sep. 16, 2008

(54) INTEGRATED CIRCUIT WITH A SCALABLE HIGH-BANDWIDTH ARCHITECTURE

(75) Inventors: Darel Emmot, Fort Collins, CO (US); Eric McCutcheon Rentschler, Fort Collins, CO (US); Michael Kennard Tayler, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 541 days.

(21) Appl. No.: 10/630,460

(22) Filed: Jul. 30, 2003

(65) Prior Publication Data

US 2005/0027891 A1    Feb. 3, 2005

(51) Int. Cl.
     *G06F 13/14*     (2006.01)
(52) U.S. Cl. ...................... 710/305; 710/316
(58) Field of Classification Search ............... 710/100, 710/110, 305, 306, 307, 308, 313, 316
See application file for complete search history.

(56) References Cited

U.S. PATENT DOCUMENTS

| | | | | |
|---|---|---|---|---|
| 5,430,859 A | * | 7/1995 | Norman et al. ............. 711/103 |
| 5,862,359 A | * | 1/1999 | Nozuyama ................... 710/316 |
| 6,172,906 B1 | * | 1/2001 | Estakhri et al. ........ 365/185.11 |
| 6,182,178 B1 | * | 1/2001 | Kelley et al. ................ 710/314 |
| 6,502,167 B1 | | 12/2002 | Tanaka et al. |
| 6,871,257 B2 | * | 3/2005 | Conley et al. ............... 711/103 |
| 7,099,994 B2 | * | 8/2006 | Thayer et al. ............... 711/114 |
| 7,103,826 B2 | * | 9/2006 | Thayer et al. ............... 714/763 |
| 2005/0014397 A1 | * | 1/2005 | Brown .......................... 439/68 |

OTHER PUBLICATIONS

Definition of Flash Memory from Wikipedia.*
Definition of Flash Memory from TechEncyclopedia.*

* cited by examiner

Primary Examiner—Khanh Dang

(57) ABSTRACT

The present invention is broadly directed to a integrated circuit component with a scalable architecture. In one embodiment, an integrated circuit component is provided comprising logic capable of being configured to interface with a first portion of a system bus, and logic capable of being configured to interface with a companion integrated circuit and to receive information that is communicated from the companion integrated circuit, which information was communicated to the companion integrated circuit via a second portion of the system bus.

19 Claims, 7 Drawing Sheets

INTEGRATED CIRCUIT WITH A SCALABLE HIGH-BANDWIDTH ARCHITECTURE

BACKGROUND OF THE INVENTION

A variety of systems are known in which a first integrated circuit component (a/k/a chip) communicates with a second or remote integrated circuit component across a bus or other communication channel.

For a variety of reasons, depending upon the system design, it often occurs that the bus bandwidth is too much for one of the integrated circuit components. Also, the pin count of one of the integrated circuit components often may be so large that it excessively drives up the manufacturing cost of the chip. In this regard, there is a recognized exponential (as opposed to linear) component to production costs for integrated circuit components in relation to pin count.

As one example, consider a system having a host processor communicating to a plurality of memory chips through a memory controller. As the number of memory chips increases, the pin count of the memory controller chip also increases. This leads to excessive manufacturing costs of the memory controller chip, which is undesirable. Likewise, the bandwidth of the system bus (between the host processor and memory controller) may exceed that supportable by the memory controller.

SUMMARY OF THE INVENTION

Accordingly, it is desired to provide a system that effectively addresses the bandwidth demands, manufacturing costs, and other shortcomings of prior art computing systems.

The present invention is broadly directed to an integrated circuit component with a scalable architecture. In one embodiment, an integrated circuit component is provided comprising logic capable of being configured to interface with a first portion of a system bus, and logic capable of being configured to interface with a companion integrated circuit and to receive information that is communicated from the companion integrated circuit, which information was communicated to the companion integrated circuit via a second portion of the system bus.

In use, a plurality of the integrated circuit components may be used to functionally mimic a single, conventional integrated circuit component. The integrated circuit component, in this embodiment, comprises a first logic interface for communicating with a remote component via a portion of a system bus, a second logic interface for communication with at least one companion integrated circuit component over a separate bus, and functional logic for performing the function of the conventional integrated circuit component being simulated by the integrated circuit component.

DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE PREFERRED EMBODIMENT

Figure 1:
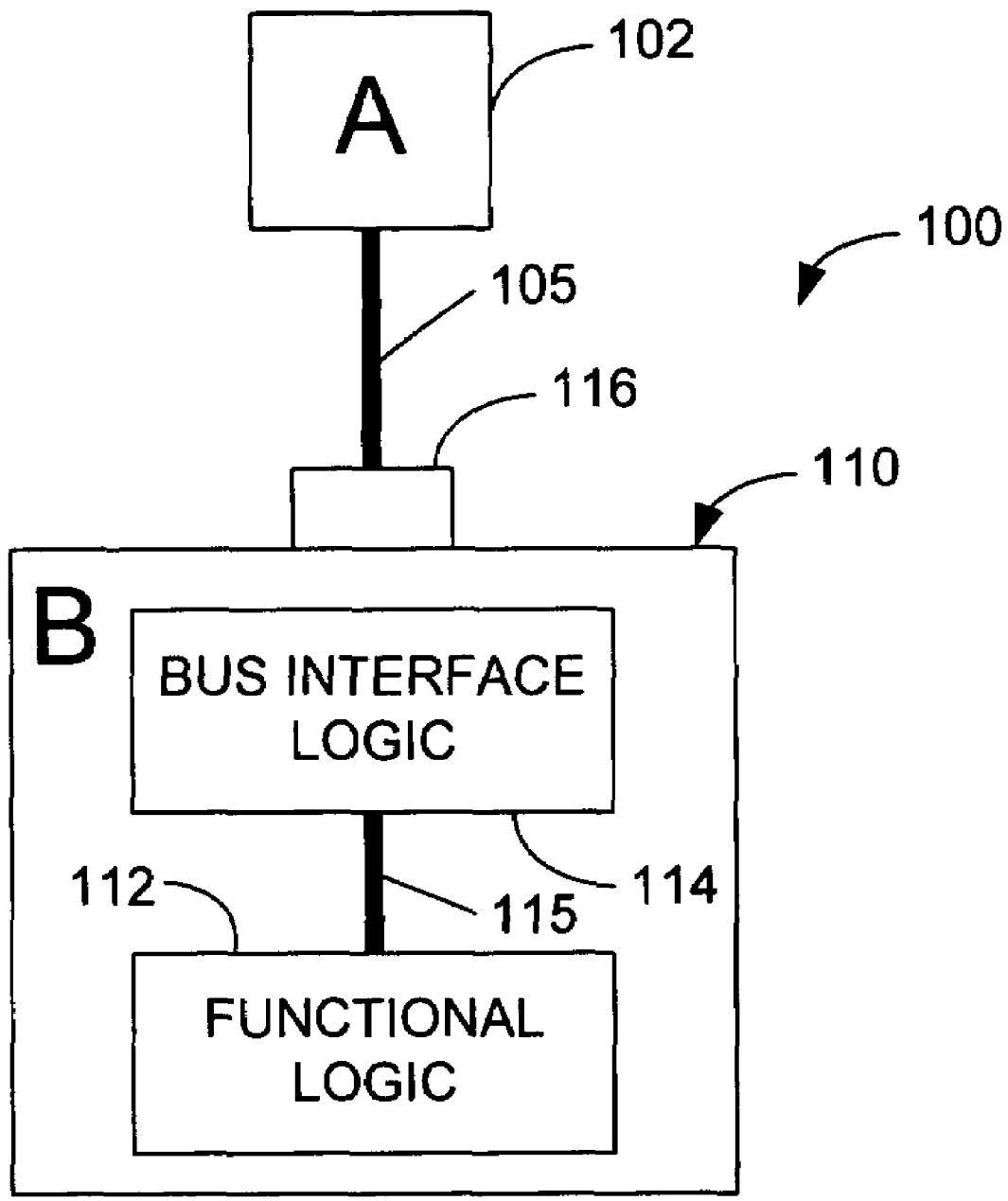
FIG. 1 is a block diagram illustrating a conventional system in which two integrated circuit components intercommunicate across a bus.

Reference is now made to FIG. 1, which is a block diagram illustrating a convention system 100, in which two integrated circuit components 102 and 110 intercommunicate across a bus 105. As will be appreciated from the description provided herein, the integrated circuit components 102 and 110 may be any of a wide variety that are suitable for a wide variety of applications. As the present invention is not limited to any particular application or functionality, the integrated circuit components 102 and 110 are illustrated generically herein. In this regard, integrated circuit component 110 may include functional logic 112 as well as interface logic 114. The functional logic 112 implements the particular function of the integrated circuit, while the interface logic 114 is for communicating with the remote integrated circuit component 102. An internal bus 115 or other communication path may be provided for communications between the functional logic 112 and bus interface logic 114. The functional logic 112, as the name implies, is the logic that is unique to the integrated circuit component 110 for carrying out the function of that device. For example, if the integrated circuit 110 is a memory controller, then the functional logic 112 may include the logic circuitry for carrying out the function of the memory controller. Likewise, if the integrated circuit 110 is a cache, then the functional logic 112 may include the memory, addressing, and control circuitry necessary for carrying out the cache functionality.

Conductive pins (denoted by a single block in FIG. 1) 116 are also provided in connection with the integrated circuit component 110. As is known, conductive pins are conventionally used for establishing and maintaining the electrical and mechanical coupling between the integrated circuit 110 and a circuit board (or substrate for carrying the integrated circuit component). Other conductive pins (not shown in FIG. 1) may also be provided on the integrated circuit 110 for communicating with other devices (not shown in FIG. 1).

In a system such as that illustrated in FIG. 1, situations sometimes arise in which the number of pins 116 increases to an amount that imposes unduly excessive manufacturing costs on the integrated circuit component 110 (e.g., when a single memory controller chip must communicate with multiple memories). In other situations or circumstances, the bandwidth across the bus 105 may exceed the bandwidth that is accommodated by the functional circuitry 112 of the integrated circuit component 110. The present invention addresses these situations.

Figure 2:
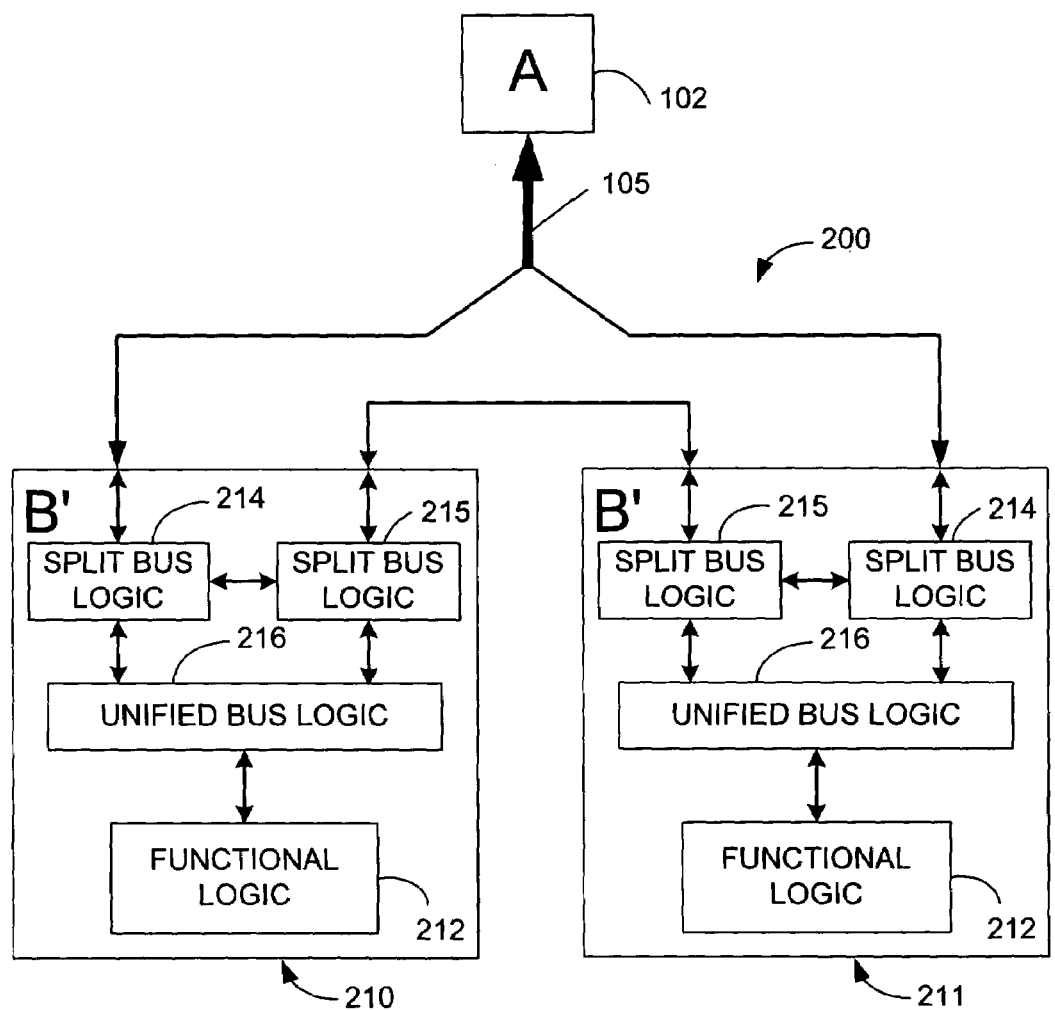
FIG. 2 is a block diagram illustrating a system constructed in accordance with one embodiment of the present invention, in which functional logic of a single, conventional integrated circuit component is split across two integrated circuit components.

Reference is now made to FIG. 2, which is a block diagram illustrating an embodiment of the present invention. As summarized above, an embodiment of the invention is directed to a system having two, companion integrated circuit components that collectively operate to emulate an integrated circuit component that is conventionally provided on a single chip. When emulating integrated circuit components, such as a memory controller that must communicate with multiple memory chips, manufacturing costs generally increase with increasing pin count. While the embodiment of the invention illustrated in FIG. 2 results in additional on-chip circuitry (described below), the combination of companion components 210 and 211 that effectively emulate a single, conventional component provides other improvements over the conventional-component approach. One such benefit is the manufacturing cost reduction by virtue of a reduction in the number of conductive pins that are required for a single integrated circuit component 210. For example, consider a memory controller that must interface with four separate memory chips. Using a companion of the present invention, would allow the memory controller function to be split across two chips, each of which only needing to communicate with two separate memory chips. The slight increase in pins to enable communication with a companion chip is overshadowed by the significant reduction in pins resulting from the reduced memory chip interface. In fact, the manufacturing cost for a single component 210 may be more than cut in half, making the use of two such components (as in FIG. 2) to emulate a single device more cost effective than using a single, conventional device. Another such benefit may be realized through bandwidth enhancements or the accommodation of greater bandwidth through the combined functional circuitry of the components 210 and 211.

The integrated circuit component 210 includes functional logic 212 that performs the functional aspects of the conventional integrated circuit component that the components 210 and 211 combine to replace. Therefore, a discussion of the functional logic 212 need not be provided herein. With regard to the inventive features of the system 200, the integrated circuit components 210 and 211 include logic blocks denoted as "split bus logic" 214 and 215 and "unified bus logic" 216.

As illustrated in FIG. 1, a conventional configuration includes integrated circuit components 102 and 110 that intercommunicate across a system bus 105. In the inventive system 200 of FIG. 2, the system bus 105 is split, so that approximately one half of the bus is directed to integrated circuit component 210, while the remaining portion of the bus 105 is directed to integrated circuit component 211. A split bus logic component 214 is provided to interface with the portion of the system bus 105 directed to that particular integrated circuit component. Both integrated circuit components 210 and 211 have blocks denoted by reference numerals 214 and 215. In one embodiment, the circuitry and logic within the split bus logic components 214 and 215 are identical. However, the logic blocks have been denoted with differing reference numerals to indicate a differing functionality, based upon the configuration of those logic blocks. For example, in the configuration illustrated in FIG. 2, the split bus logic blocks 214 are configured to interface with a portion of the system bus 105. Split bus logic blocks 215 are configured to interface with the companion logic block of the companion integrated circuit component. Thus, the split bus logic block 215 of component 210 interfaces directly with the split bus logic block 215 of component 211.

In operation, data that is received by split bus logic block 214 of component 210 is past through split bus logic 215 of component 210, and split bus logic 215 of component 211. Likewise, data received from the system bus 105 through split bus logic 214 of component 211 is passed through split bus logic 215 of component 211 and through split bus logic 215 of component 210. Through this sharing and passage of data, the entirety of the data communicated over the system bus 105 may be provided to each of the components 210 and 211. This data is consolidated by the unified bus logic component 216 of each of these two devices. Thereafter, the functional logic 212 in each of the components 210 and 211 may operate on the data as appropriate. It should be appreciated that the manner in which the functional logic 212 operates on the data will depend upon the particular embodiment and environment of the functional logic that is being implemented. A specific illustration of one embodiment is presented in connection with FIG. 5, which will be described below.

A principle benefit of the present invention is the cost reduction that is realized through reductions in manufacturing costs of the integrated circuit components 210 and 211 by virtue of pin count reduction. Although such a reduction is not necessarily evident from the illustration of FIG. 2, however, as the functional logic 212 interfaces with external integrated circuit components, the reduction in pin count can more readily be identified (see FIG. 5).

In one embodiment, not specifically illustrated, the split bus logic 214 and/or 215 may be equipped with additional logic for determining, based upon the content of the information received from the system bus 105, whether that data needs to be communicated to the companion integrated circuit component. For example, if it is determined by the split bus logic 214 of component 210 that data received from the system bus 105 is uniquely directed to the functional logic 212 of component 210, and not the functional logic 212 of component 211, then this additional logic (not shown) may determine that the received data need not be communicated to the companion component 211. It will be appreciated by persons skilled in the art that there are a variety of embodiments in which just such a determination may be identifiable, and therefore desirably implemented.

It should be further appreciated that a benefit of the integrated circuit component 210 and/or 211 of the present invention is that the system 200 may be implemented without the knowledge of component 102. That is, the two integrated circuit components 210 and 211 may be implemented in a system having the configuration illustrated in FIG. 2, in place of a conventional prior art component 110, without any configuration or other change with respect to device 102. In this regard, device 102 does not "know" whether it is dealing with a conventional component 110 or components 210 and 211 constructed in accordance with the invention.

Figure 3:
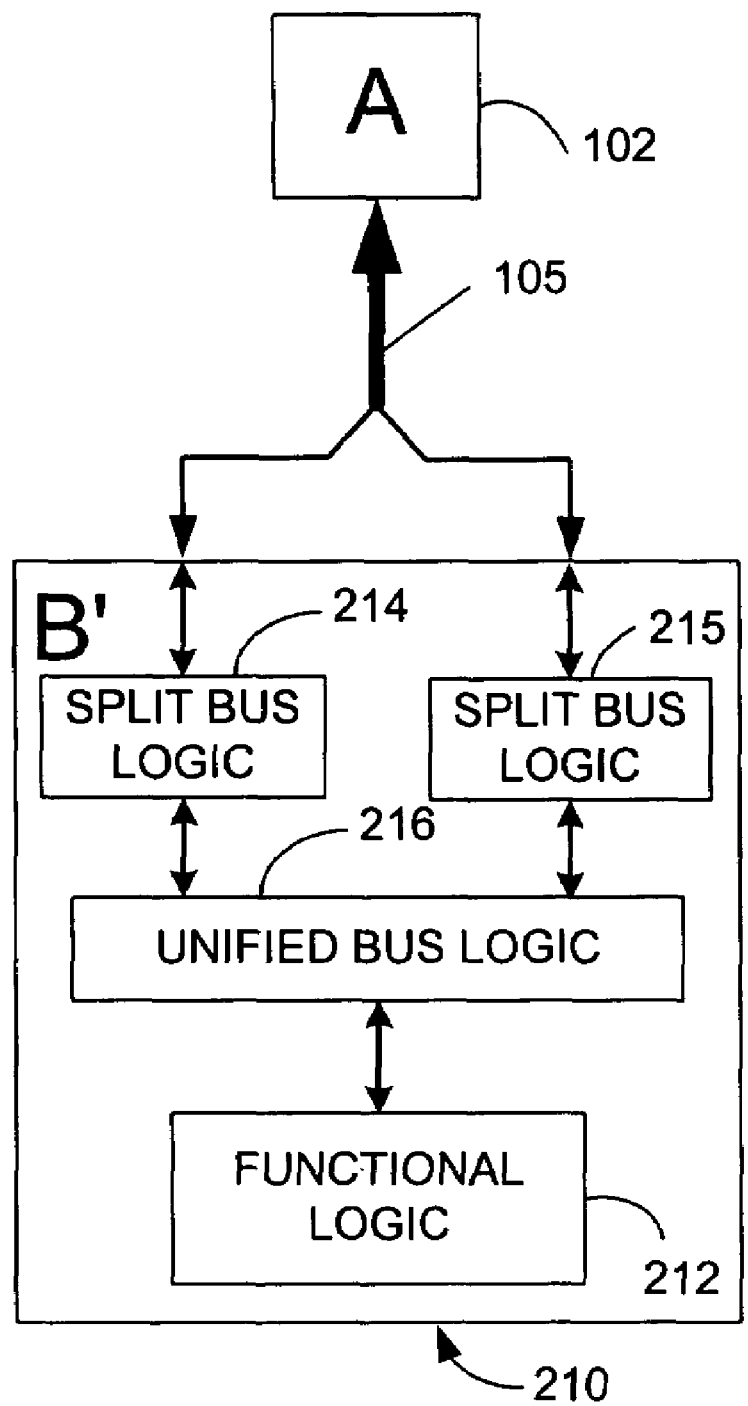
FIG. 3 is a block diagram illustrating an integrated circuit component of an embodiment of the present invention, in which a single integrated circuit component is configured to operate in a single-chip configuration to mimic an otherwise conventional integrated circuit component.

Reference is now made briefly to FIG. 3, which illustrates a component 210 constructed in accordance with the invention and configured to replace the component 110 (FIG. 1) of the prior art in a single-component configuration. In this embodiment, the component 210 contains the same internal logic elements, which include split bus logic 214 and unified bus logic 216. However, as opposed to the configuration of FIG. 2, wherein split bus logic components 215 were configured to intercommunicate data to a companion integrated circuit component, the split bus logic components 214 of the embodiment of FIG. 3 merely interface directly with the system bus 105 and communicate the data directly to the unified bus logic 216. Since only one integrated circuit component 210 is utilized in the embodiment of FIG. 3, no split bus logic component need be configured in the configuration of the split bus logic component 215 of FIG. 2.

Figure 4:
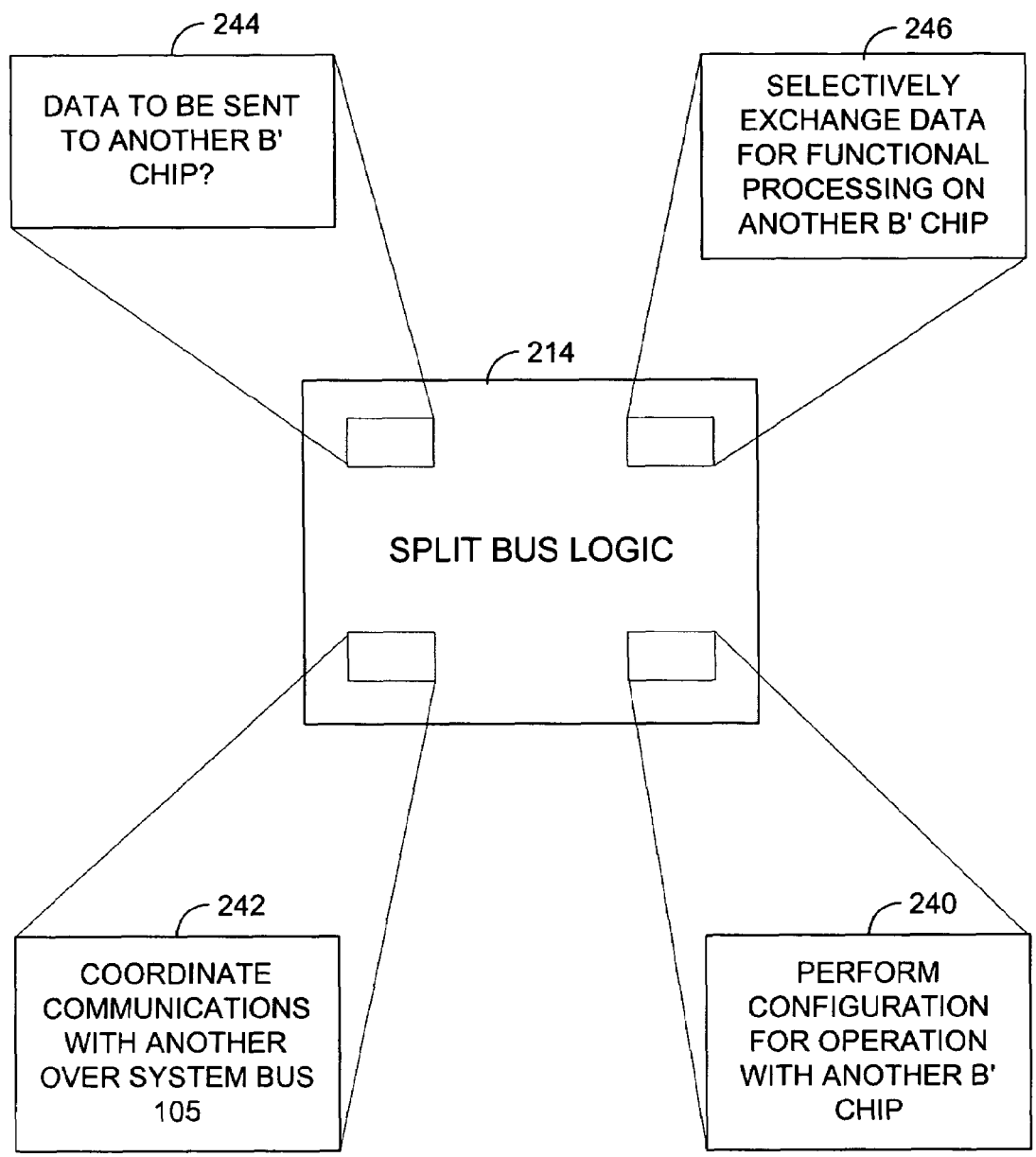
FIG. 4 is a block diagram illustrating portions of a logic interface that may be implemented in an embodiment of the present invention.

Reference is now made to FIG. 4, which illustrates certain internal logic components of a split bus logic component 214. In one embodiment, the component 214 includes internal logic 240 for performing or providing a configuration of the component 214 for operation with a companion component that is provided within a companion integrated circuit component. In essence, the logic 240 configures the split bus logic component 214 to operate in the configuration of split bus logic component 215 of FIG. 2. When in this configuration, data received from a companion split bus logic component 214 (in the same integrated circuit component) is communicated over an external bus or communication path to a companion split bus logic component in a different (companion) integrated circuit component.

Another component 242 within the split bus logic 214 coordinates and controls communications over the system bus 105. This component 242 may be implemented using known circuitry and logic for performing protocol conversions and other actions that are customary and appropriate for communicating with external devices over a specified communication bus.

Component 244 may be provided for determining whether data received from the system bus 105 is to be communicated to a companion integrated circuit component. As previously mentioned, the split bus logic may include sufficient intelligence to determine, based upon the content of the information received over the system bus 105, whether the data received over the system bus 105 is to be communicated to a companion integrated circuit component. Finally, a component 246 may be provided to selectively exchange data with a companion split bus logic component of a companion integrated circuit component for processing by the functional logic within that companion integrated circuit component. Of course, additional components may be provided within the split bus logic 214, as will be appreciated by persons skilled in the art, but need not be described herein for purposes of understanding the structure and operation of the illustrated embodiment of the present invention.

Figure 5:
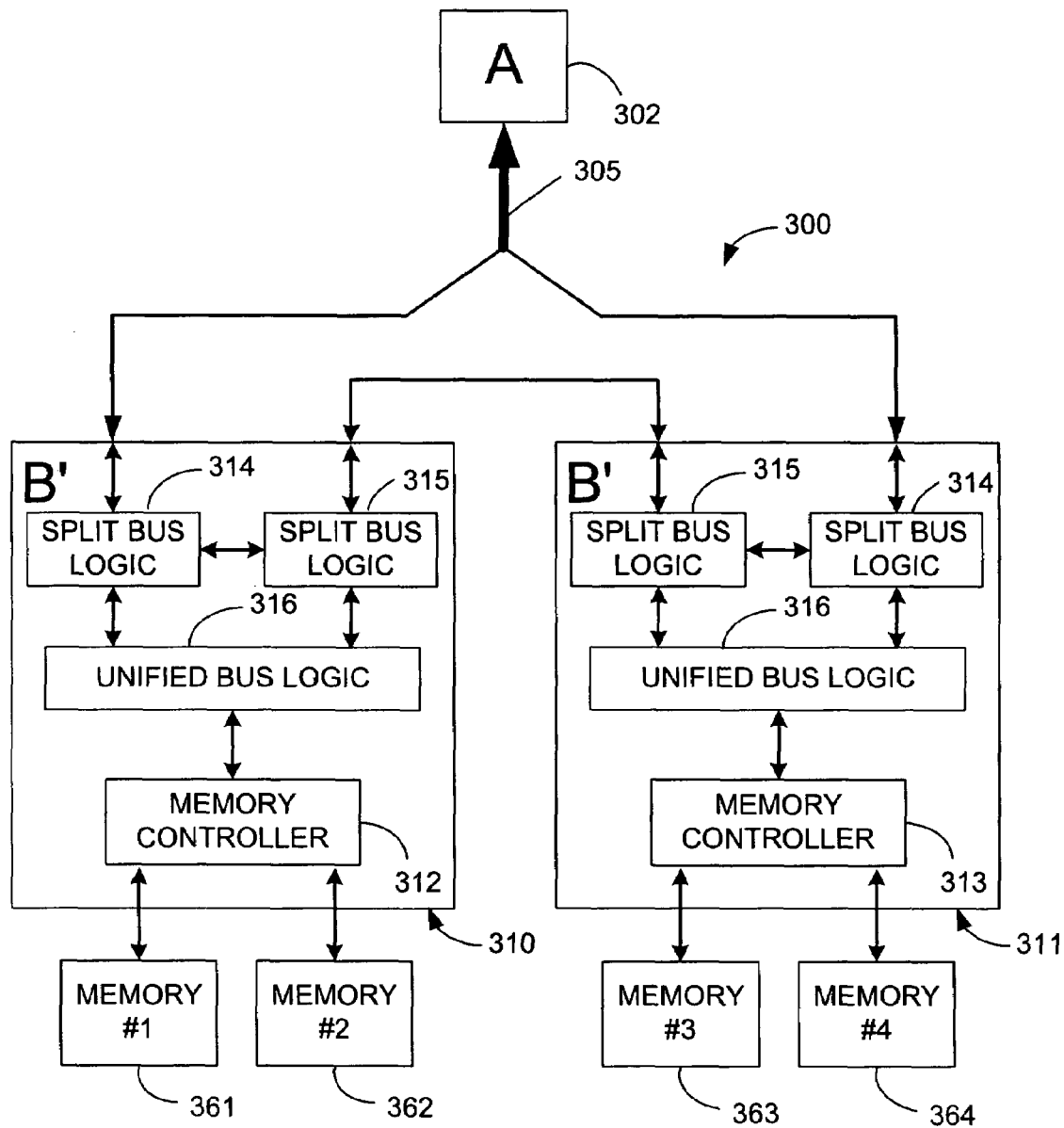
FIG. 5 is a block diagram similar to FIG. 2, illustrating an embodiment of the present invention, in which a plurality of integrated circuit components implement a memory controller component.

Finally, reference is made to FIG. 5, which is a diagram similar to FIG. 4, illustrating the implementation of components 310 and 311, constructed and configured in accordance with the present invention, to implement a memory controller device. In this regard, the system 300 includes a system bus 305 that communicates with a device, such as a host processor 302. The host processor 302 may issue commands to read and/or write to memory devices 361, 362, 363, and 364. The internal components, including the split bus logic components 314 and 315 and the unified bus logic component 316 are configured to operate in the manner described in connection with FIG. 2 herein. The functional logic 212 illustrated and described in connection with FIG. 2 is replaced by the memory controller logic 312 and 313 of FIG. 5.

By way of illustration, suppose the host process 302 wishes to read data from memory 1 361. Appropriate address and control signals are asserted on the system bus 305 to implement such a memory read command. Approximately one half of this system bus is directed to component 310 while the remaining portion of the signals of the system bus 305 are directed to component 311. Since the memory 361 to be accessed is coupled with component 310, the split bus logic components within component 310 may determine that no information received from the split bus logic 314 of component 310 needs to be communicated to the split bus logic component 315 of component 311. However, depending upon the bus configuration of system bus 305, data or information communicated to the split bus logic 314 of component 311 may be required to be communicated through the split bus logic components 315 so that the information may be unified by logic 316 for communication to the memory controller 312.

Likewise, once data is read from the memory 361 and passed through the memory controller 312 and unified bus logic 316 of component 310, part or all of the information may be communicated through split bus logic 314 of component 310, the system bus 305, to the host processor 302. Similarly, all or part of the information may be passed through split bus logic components 315 of components 310 and 311, the split bus logic 314 of component 311, the system bus 305 and onto the host processor 302. The direction and routing of information through the various subcomponents of integrated circuit components 310 and 311 will depend largely upon the structure, design, and protocol of the system bus 305. In one embodiment, the present invention is designed for operation with a point-to-point serial bus, having multiple data and control lines for communicating data and control signals between integrated circuit components. However, consistent with the concepts and teachings of the present invention, other types of system bus configurations may be supported.

As mentioned above, one benefit of one embodiment of the invention is lower manufacturing costs resulting from a reduced number of pins (per chip) for carrying out the collective operation (e.g., configurations of FIGS. 2 and 5). In such embodiments, a first set of conductive pins is provided on the component for carrying communications between the split logic bus interface 214 and the portion of the system bus 105 (e.g., communications with a remote component 102). A second set of conductive pins is provided on the component for carrying communications between the companion split logic bus interfaces 215 of companion components. Additional conductive pins may be provided for carrying other control and communication signals. Importantly, the total number of conductive pins for the integrated circuit component is fewer than a conventional integrated circuit component for performing the same functional operation.

The above paragraph illustrates how, in one embodiment, two chips may be connected on the system bus without increasing the number of system bus pins on each component, which is one advantage of this invention. With regard to FIG. 5, however, another significant reduction in pin count is realized. In this regard, a conventional memory controller component would require 4 sets of memory interconnect pins to interface the four memory busses of memories 361, 362, 363, and 364 to the system bus 305. The present invention, as shown in FIG. 5, reduces the required memory interface pins per component by half (per chip), which will result in a significant reduction in the manufacturing cost of the component.

Thus, the present invention provides for reduced manufacturing costs and enhanced design flexibility.

Figure 6A:
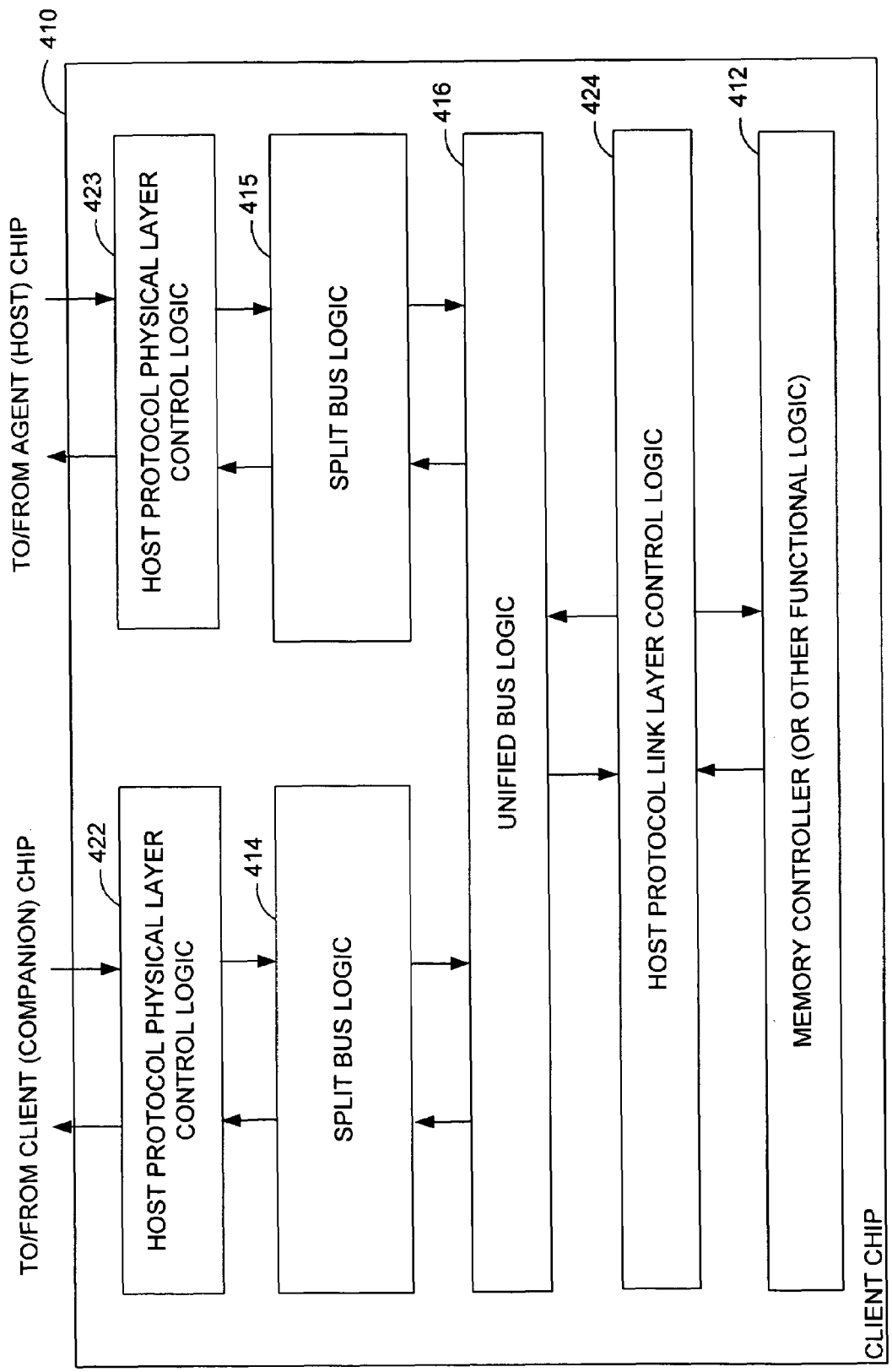
FIGS. 6A and 6B are diagrams providing a more detailed illustration of an integrated circuit component of one embodiment of the invention.
Figure 6B:
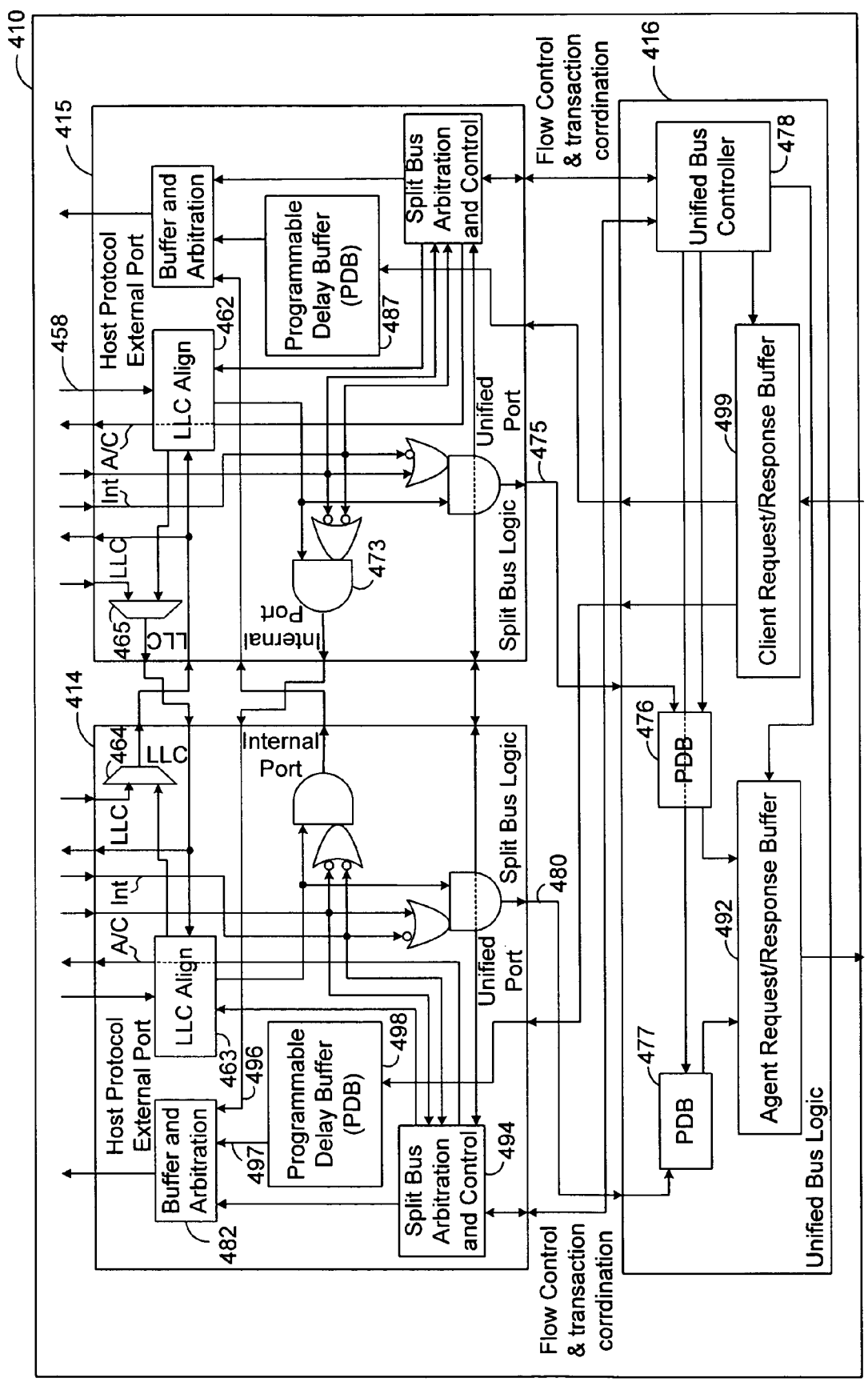

Having described various aspects of embodiments of the present invention, it should be appreciated that there are a variety of ways in which the functionality described above may be specifically implemented in an integrated circuit component, in accordance with the scope and spirit of the present invention. FIGS. 6A and 6B illustrate one particular implementation. The description that follows, with regard to these figures, first provides a high-level description of the operation of the components shown therein. Thereafter, a more detailed description will be provided of the informational flow that takes place through the logic illustrated in those figures, as well as the operation of certain particular signals illustrated therein. It should be appreciated, however, that the diagrams of FIGS. 6A and 6B are merely illustrative of one implementation, and other implementations may be provided in accordance with the invention. Further, it should be appreciated that certain particular details of the implementation of the elements illustrated in FIGS. 6A and 6B are not described herein, as they will be appreciated and understood by persons skilled in the art from the description that is provided herein.

First, where possible the reference numbering of the components in FIGS. 6A and 6B generally corresponds to that of previous figures. For example, component 410 of FIGS. 6A and 6B loosely correspond to component 310 of FIG. 5. Likewise, split bus logic components 414 and 415 of FIGS. 6A and 6B loosely correspond to the split bus logic components 314 and 315 of FIG. 5. Similar correspondence between other components and reference numbering has been preserved. FIG. 6A, however, illustrates additional components, including host protocol physical layer control logic 422 and 423, as well as a host protocol link layer control logic 424. Internal logic elements of these principle components have not been illustrated herein, as they will generally be understood by persons skilled in the art. In this regard, the host protocol physical layer control logic 422 and 424 essentially provides the circuitry and logic appropriate for interfacing between the physical signal lines (that connect externally with the circuit component 410) with the corresponding split bus logic components 414 and 415 respectively. A greater understanding of the circuitry and/or logic within the host protocol physical layer control logic components 422 and 423, for the embodiment illustrated herein, will be better understood with reference to FIG. 6B, which illustrates the principle logic and circuitry components of the split bus logic 414 and 415.

Likewise, the host protocol link layer control logic 421 generally includes the circuitry and logic appropriate for interfacing the unified bus logic 416 with the functional logic (e.g., memory controller) 412. This logic will necessarily vary based upon the particular functional logic 412 that is implemented in a particular embodiment. Beyond these additional components, the principle functional operation of the remaining components illustrated in FIG. 6A have been generally described above in connection with embodiments of the invention.

Therefore, reference is now made to FIG. 6B, which illustrates certain circuitry and logic components of the split bus logic elements 414 and 415, and the unified bus logic 416, in accordance with one embodiment of the present invention. Before providing a specific description of the circuitry illustrated in FIG. 6B, it should be understood that the broader aspects of the present invention are protocol independent. In one embodiment of the invention, there are various protocol layers. For example, the protocol of a physical layer specifies how data flows across physical circuitry and wires into and out of the chip 410. A link layer essentially operates to accumulate a certain number of bits from the physical layer until enough data has been collected to act upon, or comprise a transaction at the link layer. Beyond the link layer, a protocol layer accumulates link layer transactions to form packets for transmission. Indeed, at the protocol layer, multiple packets may be accumulated to form read and/or write transactions. In one embodiment, the chip 410 of the present invention is interposed between a host protocol physical layer and a host protocol link layer. Interposing the chip 410 in this manner allows the chip to break up and recombine host protocol transactions.

From a fundamental operational standpoint, an agent (e.g., host processor (reference numeral 302 of FIG. 5)) drives transactions of a physical protocol on a system bus. The circuit components of an embodiment of the present invention operate to effectively split the transactions of the system bus in a manner that is transparent to the agent or host. The operation of the inventive chip will be described herein as a client, and two companion client chips combine to split transactions with the host over the system bus. It should be appreciated that the inventive components can respond to agent requests or can, likewise, request responses from the agent. At the link layer, where the inventive components operate, a request or response from the agent appears the same, in that it is simply data that is passed through into the protocol layer, so that the protocol layer can interpret the data.

The logic and circuitry illustrated in FIGS. 6A and 6B illustrate only one, of a companion set of two, inventive circuit components. It will be appreciated that the companion circuit component (not shown) is a mirror image of the component illustrated in the drawings, and therefore both components need not be illustrated in order to understand the cooperative operation between the two. In the particular embodiment illustrated, the logic components on the right hand side of the drawing are configured to interface with one half of the host or system bus, while the logic components on the left hand side of the drawing are configured to communicate with a companion chip. As mentioned above, there are a variety of physical buses that may be supported by the logic and circuitry of the present invention. In one contemplated embodiment, the system bus comprises a full duplex, serial point-to-point bus.

The following description provides a brief functional description to illustrate certain basic transactions within the logic and circuitry illustrated in FIG. 6B. In response to an agent request, the signals comprising the request enter the split bus logic 415 on signal lines 458. These signals (illustrated as a single line 458 in the drawing) preferably comprise eight data signals one cyclical redundancy check (CRC) signal line, and one link level control signal line. These are passed to a link level control (LLC) alignment logic block 462. It will be appreciated that an equal amount of information is communicated into the LLC alignment component of the companion chip, which gets forwarded to the link level control and alignment component 463 of the split bus logic component 414. The two split bus logic components 414 and 415 need not share or transfer either the data or the CRC information. However, in order to operate effectively at the link layer, the LLC information is exchanged between the two split bus logic components 414 and 415. Accordingly, the LLC align component 462 forwards the bit of LLC data to the LLC alignment block 463 via multiplexer 465. Likewise, the LLC alignment block 463 forwards its LLC information to the LLC alignment block 462 via multiplexer 464. In this way, both split bus logic components 414 and 415 possess full LLC information pertaining to the data packet.

Thus, in the illustrated implementation, the interchip link has data lines to support one half of the host protocol (to communicate the data transferred with the host to the companion chip). It also has an additional full-duplex data line for link-layer control, so that all of the link-layer control information is forwarded/exchanged between the client chips. This allows logic within the client chips to determine whether a given packet contains valid data or not. If a packet does contain valid data, then the packet is sent through the AND gate 473 to the split bus logic 414, and through the transaction buffer and arbitration logic 482 to the companion client chip. Likewise, data received at the client chip from the system bus on signal lines 458 is routed through LLC alignment component 462, through a unified port 475 into a programmable delay buffer 476 of the unified bus logic 416.

It should be appreciated that the programmable delay buffers 476 and 477 within the unified bus logic 416 operate to delay the data received from the respective split bus logic blocks 414 and 415 until the data may be combined in the agent request/response buffer 492, as controlled by the unified bus controller 478, and thereafter communicated to the host protocol link layer control logic 424. In one embodiment, the programmable delay buffer 477 is programmed with a delay of zero, while the programmable delay buffer 476 is programmed with an appropriate delay. In this regard, data received from the agent via signal lines 458 is passed through the LLC alignment component 462, through the unified port 475, and into programmable delay buffer 476. Since data received from the agent at the companion chip must be passed through the split bus logic of the companion chip into the split bus logic component 414 of the chip 410, through its LLC alignment component 463 and unified port 480, before reaching programmable delay buffer 477, it will be appreciated that the data received from the agent on signal lines 458 will arrive at programmable delay buffer 476 first. Therefore, this data needs to be appropriately delayed, so as to match the latency of the data communicated from the companion chip and received in programmable delay buffer 477. This latency delay that is programmed into programmable delay buffer 477 may be predetermined, or may be measured through a training sequence upon power up of the system.

The foregoing has generally described how an inventive aspect of one embodiment receives a packet of data from an agent and communicates that information to a companion chip (not shown). It will be appreciated, however, that beyond this principle informational flow, a variety of implementation details will preferably be managed. In this regard, arbitration logic is preferably included to manage contentions that may arise over physical signal lines. For example, with reference to the transaction buffer and arbitration component 482, this component receives one input 496 that comprises data, communicated through the AND gate 473, which arrives from the agent (host). Another input 497 is communicated from a client request/response buffer 499 of the unified bus logic 416, via a programmable delay buffer 498. It should be appreciated that it is possible that a client may send a request at the same time that an agent sends a request, such that data arrives on inputs 496 and 497 at the same time (to be communicated through the transaction buffer and arbitration component 482 to the companion chip). Such a possible conflict is preferably managed through arbitration control. Such arbitration control logic is provided by block 494.

Consistent with the illustrated embodiment, a variety of arbitration schemes may be implemented, and the illustrated embodiment is not limited to any particular arbitration scheme. Indeed, the arbitration rules may differ depending upon whether the component 410 is arbitrating at the interchip link or at the agent link. If arbitrating at the interchip link, (e.g., components 494 and 482) then the agent packet received on signal lines 496 have priority. It should be further appreciated that, if the agent is streaming transactions, client transactions may be bottlenecked. However, since the client will not be able to respond to the agent's transactions, the agent will eventually run out of buffer space and will stop sending requests, due to the lack of response. Once the agent stops sending transactions, then client transactions communicated through line 497, may be communicated through the transaction buffer and arbitration logic 482.

By way of illustration, for a client transaction, the client may issue a transaction through the protocol layer into the link layer, and the link layer may issue into the client request/response buffer 499. There the request would be partitioned. One half would be communicated through the programmable delay buffer 487, while the other half would be communicated through the programmable delay buffer 498. Since communications through the split bus logic 414 are communicated to the companion chip, that latency path will inherently be longer than the path through split bus logic 415. Accordingly, the programmable delay buffer 498 will preferably set to zero delay, while the programmable delay buffer 487 will preferably be programmed to impart a delay that is equal to the latency of the data path communicated through split bus logic 414 and the split bus logic component of the companion chip. Again, the specific amount of this latency or programmed delay may be predetermined based on a priori knowledge of the specific circuit design, or may be more flexibly determined through a measured value during a power-up measurement routine.

FIG. 6 also illustrates two specific physical signal lines labeled "A/C" and "INT." The signal carried on the A/C line identifies whether the agent originated the transaction, or whether the client originated the transaction. In this regard, it should be understood that, if the agent originated the transaction, then the transaction need not be forwarded to the agent (since the agent originated the transaction). Instead, the transaction needs only to be forwarded to the unified bus logic. If, however, the client initiated the transaction, then it does need to be forwarded to the agent. Thus, for every packet sent on the interchip link, it is indicated whether it is from an agent or client. With regard to the "A/C" signal line on the agent side of the bus, the signal line may be hard-wired.

With regard to the "INT" signal line. This signal indicates whether the transactions on this half of the chip are an interchip link or an agent link. This signal line is used for both the programmable delay buffer and arbitration logic components. As illustrated, this signal is also passed to OR gates. If the signal indicates that the interface is not an interchip link (i.e., it is an agent link), then data coming from the external port is routed both to the unified logic and to the client chip.

As mentioned above, the chip 410 of the illustrated embodiment may be configured to operate with a companion chip, or may alternatively, be configured to operate in an exclusive mode, with the host or agent chip. In such a configuration, both sides of the split bus logic are configured to interface with one half of the system bus. Providing the "A/C" and "INT" signal lines, this configurability, and correspondingly-appropriate circuit operation, may be achieved. Further, since either split bus logic component 414 and 415 may be configured to communicate with either an agent link or an inter-chip link, the circuitry within the two split-bus logic components 414 and 415 are mirror imaged.

The description provided here and above has been provided in connection with an embodiment having the circuitry on the right hand side configured to operate in communication with a host/agent link, while the circuitry on the left hand side is configured to operate with a companion chip.

As previously mentioned, the description provided above, and illustration of FIGS. 6A and 6B, are directed to one particular implementation of an embodiment of the invention. Additional details will be appreciated by persons skilled in the art, and need not be provided herein. To reiterate, significant features of the illustrated embodiment include the LLC alignment functionality, whereby link layer control information is fully exchanged between the two split bus logic components 414 and 415. This allows the determination of whether data links are idol, before sending data. This further reduces the bandwidth on the interchip link, by avoiding the situation of having to continually stream data, resulting from the inability to determine whether a current packet is an idle packet or not. Another significant feature or concept of the illustrated embodiment relates to the programmable delay buffers, which provide the requisite delay of information so that communications over the interfaces with the host bus may be synchronized properly between companion chips.

Again, since there are a wide variety of particular functional and system variations, implementation-specific details need not be provided herein as such details will often be driven by design objectives and tradeoffs, and are within the level of skill possessed by one of ordinary skill in the art.

What is claimed is:

1. A single integrated circuit component comprising:
   logic capable of being configured to interface with a first portion of a system bus, wherein the first portion of the system bus comprises only approximately half of a set of signal lines that make up the system bus; and
   logic capable of being configured to interface with a companion integrated circuit, which companion integrated circuit is separate from the single integrated circuit component, and to receive information that is communicated from the companion integrated circuit, which information was communicated to the companion integrated circuit via a second portion of the system bus, wherein the second portion of the signal bus comprises a remaining portion of the system bus not included in the first portion, wherein the logic capable of being configured to interface with the first portion of the system bus is operatively connected with the logic capable of being configured to interface with the companion integrated circuit.

2. The integrated circuit component of claim 1, further including link layer control logic in both the logic capable of being configured to interface with the first portion of the system bus and the logic capable of being configured to interface with the companion integrated circuit, the link layer control logic being configured to exchange link layer control information, such that both the logic capable of being configured to interface with the first portion of the system bus and the logic capable of being configured to interface with the companion integrated circuit possess complete link layer control information for the data being communicated over the system bus.

3. The integrated circuit component of claim 1, further including a programmable delay buffer in both the logic capable of being configured to interface with the first portion of the system bus and the logic capable of being configured to interface with the companion integrated circuit, wherein the respective programmable delay buffers are configured with differing delays so that communications from the integrated circuit component with the system bus are synchronized with communications from the companion integrated circuit and the system bus.

4. The integrated circuit component of claim 1, further comprising unified bus logic configured to consolidate information received from both logic elements.

5. The integrated circuit component of claim 1, further comprising functional logic for performing at least one logic operation for the integrated circuit component.

6. The integrated circuit component of claim 1, wherein the system bus is a point-to-point serial communication bus.

7. The integrated circuit component of claim 5, wherein the functional logic performs the logic operation of a memory controller.

8. The integrated circuit component of claim 1, further comprising logic capable of configuring the integrated circuit component for operation with a companion integrated circuit component.

9. The integrated circuit component of claim 1, further comprising logic capable of configuring the integrated circuit component for operation in a stand-alone configuration.

10. The integrated circuit component of claim 1, wherein the first portion of the system bus is substantially one-half of the system bus.

11. A system comprising:
    a plurality of separate, companion integrated circuit components that collectively implement a logic function embodied in a single, conventional integrated circuit component, each single companion integrated circuit component comprising:
        a first logic interface for communicating with a remote component via a portion of a system bus, wherein the portion of the system bus comprises only approximately half of a set of signal lines that make up the system bus;
        a second logic interface for communication with a companion logic interface of a remaining one of the plurality of the integrated circuit components over a separate bus, wherein the first logic interface is operatively connected with the second logic interface; and
        logic for controlling the selective communication of information received by the first logic interface via the portion of the system bus through the second logic interface to the companion integrated circuit.

12. The system of claim 11, wherein the logic for controlling the selective communication of information received from the first logic interface through the second logic interface further includes first split bus logic configured to interface with the first logic interface, and second split bus logic configured to interface with the second logic interface.

13. The system of claim 12, further including link layer control logic in both first split bus logic and the second split bus logic, the link layer control logic being configured to exchange link layer control information, such that both the first split bus logic and the second split bus logic possess complete link layer control information for the data being communicated over the system bus.

14. The system of claim 12, further including a programmable delay buffer in both the first split bus logic and the second split bus logic, wherein the respective programmable delay buffers are configured with differing delays so that communications between the integrated circuit components and their respective portions of the system bus are synchronized.

15. The system of claim 11, further comprising functional logic that performs a conventional functional operation.

16. The system of claim 11, wherein the functional logic comprises a memory controller.

17. The system of claim 16, further comprising integrated circuit memory components in communication with the memory controller.

18. The integrated circuit component of claim 11, further comprising logic capable of configuring the integrated circuit component for operation with a companion integrated circuit component.

19. The integrated circuit component of claim 11, further comprising logic capable of configuring the integrated circuit component for operation in a stand-alone configuration.

* * * * *